United States Patent [19]

Hans et al.

[11] Patent Number: 4,466,503

[45] Date of Patent: Aug. 21, 1984

[54] BEARING ASSEMBLY FOR THE DRIVEN WHEEL OF A VEHICLE

[75] Inventors: Rüdiger Hans, Niederwerrn; Roland Haas, Lendershausen, both of Fed. Rep. of Germany

[73] Assignee: SKF Kugellagerfabriken GmbH, Schweinfurt, Fed. Rep. of Germany

[21] Appl. No.: 423,130

[22] Filed: Sep. 24, 1982

[30] Foreign Application Priority Data

Sep. 26, 1981 [DE] Fed. Rep. of Germany ....... 3138366

[51] Int. Cl.³ ............................................. B60K 17/30
[52] U.S. Cl. ................................ 180/259; 188/18 A; 301/9 CN; 308/191
[58] Field of Search ...................... 180/70 R, 258, 259; 308/236, 191; 188/18 A; 301/9 CN, 108 SC, 126

[56] References Cited

U.S. PATENT DOCUMENTS 1,846,079  2/1932  Bellamore ........................ 301/9 CN
2,906,558  9/1959  Forbush ........................... 301/9 CN

*Primary Examiner*—John A. Pekar
*Attorney, Agent, or Firm*—Eugene E. Renz, Jr.

[57] ABSTRACT

A hub bearing assembly for the wheel of a motor vehicle comprising a wheel flange having means for mounting the wheel of the vehicle thereto and a drive joint including a sleeve member, a roller bearing assembly mounted on the outer periphery of said sleeve member said wheel flange and sleeve member having confronting interengaging means, said flange and sleeve member having internal thread sections, said wheel flange having a central bore with a thread of a pitch differing from the bore thread of the sleeve member of the joint and a threaded bolt with differential thread portions engageable in the aligned bores of the wheel flange and sleeve member of the joint whereby to axially adjust the sleeve member of the joint, the wheel flange, and the bearing arranged therebetween.

6 Claims, 2 Drawing Figures

PITCH L of 24 < PITCH L of 25

BEARING ASSEMBLY FOR THE DRIVEN WHEEL OF A VEHICLE

BACKGROUND AND SUMMARY OF THE INVENTION

The present invention relates to a hub bearing assembly for a driven wheel of a motor vehicle wherein the drive shaft, hub and wheel are non-rotatably connected together and wherein the drive shaft terminates in a joint which supports the inner ring of the bearing assembly and which is provided on the free front side with a front gear tooth arrangement which engages with the mating front gear tooth arrangement of the wheel fastened on the outer part of the coupling by means of a nut or the like threaded into a bore.

U.S. Pat. No. 2,906,558 shows a bearing arrangement generally of the above type. In this prior known construction, the shaft terminates in a joint, the outer part of which serves as a hub for a double row rolling bearing assembly. The free front side is provided with a radially centering front gear tooth arrangement which engages with a mating counter gear tooth arrangement of the wheel. The inner race ring for one row of the double row bearing is directly machined in the outer peripheral surface of the outer part of the joint. Additionally it has a bearing surface for a bearing race which carries the second inner race ring of the rolling bearing assembly as well as a threaded section to receive a nut for axial fastening and adjustment of the bearing race. Another nut threaded in an internal thread of the outer part of the joint pushes the wheel into the front gear tooth arrangement of the outer part of the joint.

A drawback in this known prior assembly is the fact that the outer part of the joint has an extremely complicated outer surface configuration comprising a plurality of different sections such as the race, bearing surface and thread section which are somewhat expensive to fabricate. Furthermore, an additional nut is required for axial fastening and adjustment of the bearing. Moreover, the nut required for fastening the wheel to the outer part of the joint extends substantially in a radially outward direction and has several ears for engagement by a tool or the like to thread or actuate the nut. These projections or ears increase the risk of damage.

With the foregoing in mind, it is an object of the present invention to provide an improved hub bearing assembly of the above type characterized by novel features of construction arrangement wherein the individual parts and especially the outer part of the joint are configured of a simple shape which can be easily manufactured and additionally the number of individual parts, particularly those necessary for connecting and fastening the wheel bearing unit are reduced considerably. To this end, in accordance with the present invention, the rolling bearing which is a separate unit from the outer part of the joint is supported between two shoulders of the outer joint part and the wheel flange carrying the wheel and the wheel flange has a threaded central bore having a thread pitch differing from the threads in the bore of the outer sleeve member of the joint. An externally threaded bolt with differential threads or the like threads into the aligned bores of the outer part of the joint and the wheel flange to axially adjust the outer part of the joint, the wheel flange, and the rolling bearing mounted therebetween.

By this construction, the outer peripheral surface of the sleeve member of the joint merely has to be provided with the bearing seat of the rolling bearing which can be easily and economically machined. Furthermore, only a single bolt element is needed for connecting and fastening the parts and for preloading or adjusting the rolling bearing. In accordance with the present invention, and specifically by reason of the differential thread arrangement in the bore of the wheel flange and the sleeve member of the joint and the bolt member, the bearing is simultaneously preloaded or braced in an axial direction and therefore adjusted by the thread of the bolt which also simultaneously non-rotatably connects the wheel rim with the outer sleeve member of the joint by means of interengaging meshing gear teeth of the wheel rim flange and sleeve member respectively. By this arrangement, the rolling bearing does not require any additional fastening elements.

In accordance with another feature of the present invention, the threaded bolt member may be formed with a radially outwardly directed circumferentially extending flange defining a centering surface for the wheel and/or a brake disc. By this arrangement, the wheel may be loosened at any time without affecting the connection of the other parts.

In accordance with still another feature of the present invention, the threaded bolt is provided with a central bore having a multi-faceted planar surface configuration defining a keyway for engagement of a fastening key. By this arrangement, the threaded bolt only has a slight extension so that the damage hazard is additionally reduced as a result of the interiorly located engagement surface for the fastening tool.

BRIEF DESCRIPTION OF THE DRAWING

These and other objects of the present invention and the various features and details of the operation and construction thereof are hereinafter more fully set forth with reference to the accompanying drawing, wherein.

DESCRIPTION OF THE PREFERRED EMBODIMENT

Figure 1:
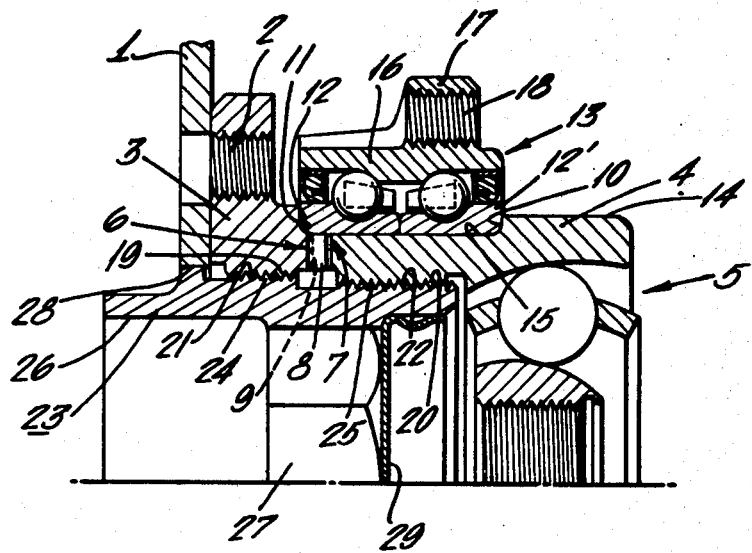
FIG. 1 is a transverse sectional view of a bearing assembly for a driven wheel of a motor vehicle in accordance with the present invention.
Figure 2:
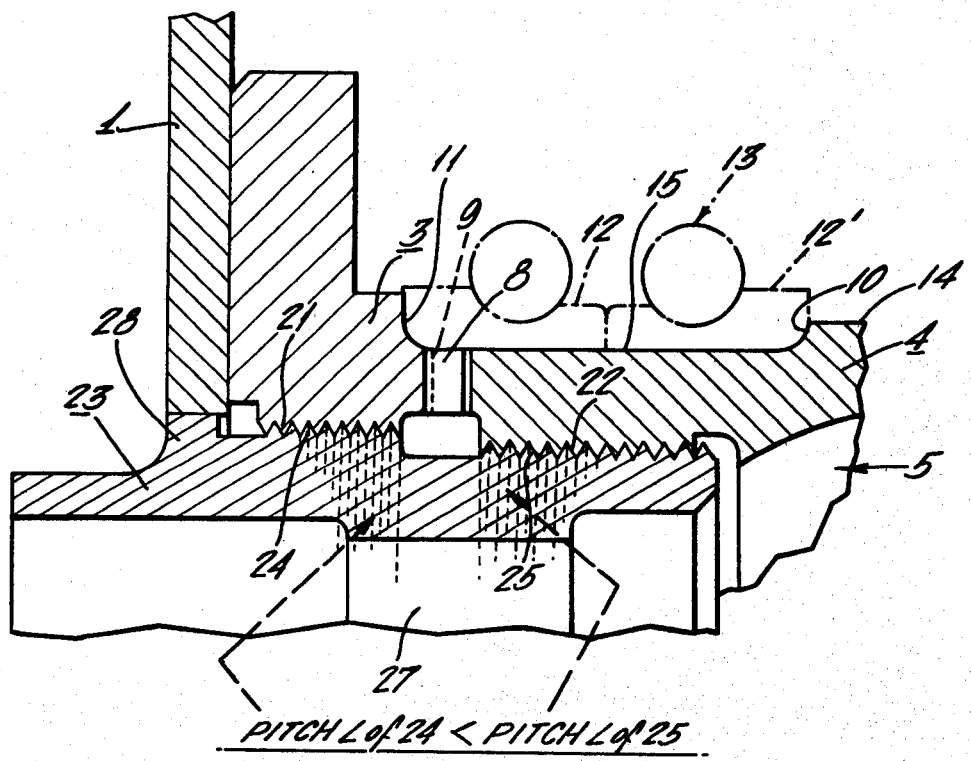
FIG. 2 is an enlarged fragmentary sectional view showing the differential thread arrangement.

Referring now to the drawing, there is illustrated a hub bearing assembly for a driven wheel of a motor vehicle. The assembly includes a wheel flange 3 having a series of axially extending circumferentially spaced bores 2 for bolts which engage through the wheel 1 and secure it to the wheel flange 3. The wheel flange 3 is non-rotatably connected with an annular sleeve member 4 forming part of a homokinetic joint 5. The confronting axial end faces of the wheel flange 3 and sleeve member 4 are provided with meshing interengaging gear teeth 8 and 9. A bearing assembly 13 circumscribes the sleeve member 4 and includes inner ring parts or members 12, 12' which seat between a shoulder 10 formed in the outer peripheral surface of the sleeve member 4 and a shoulder 11 on the outer periphery of the wheel flange 3. The inner ring members 12, 12' are mounted on a common bearing surface 15 machined into the outer peripheral surface 14 of the sleeve member 4. The rolling bearing 13 further includes a common outer ring 16 having a radially outwardly directed flange 17 formed integrally therewith which has a series of axially extending, circumferentially spaced bores 18 to fasten the wheel bearing assembly by means of bolts to a vehicle frame (not shown).

In order to connect the wheel flange 3 with the homokinetic joint 5 to effect rotation of the wheel upon actuation of the joint, a bolt member 23 is provided which engages in the bore of the wheel flange 3 and the sleeve 4. In the present instance, the wheel flange and sleeve are locked together as a driving unit through the intermeshing interengaging teeth 8 and 9 by means of the threaded bolt 23 which has axially spaced thread sections 24 and 25 formed on the outer peripheral surface thereof, the thread portions 24 and 25 having different pitches. The wheel flange 3 and sleeve 4 are formed with threads on their inner peripheral surface with threads 21 and 22 respectively having different pitches wherein the pitch of the thread 22 is greater than the pitch of the thread 21. By this arrangement, the threaded bolt 23 may be threaded into the aligned bores of the wheel flange 3 and the sleeve member 4, and by reason of the different pitch configuration of the interengaging threads moved towards one another to a position where the gear teeth 8 and 9 mesh and interengage. Simultaneously the inner ring members 12, 12' of the roller bearing 13 are pressed together and thus the rolling bearing is adjusted or preloaded in this assembly process. To facilitate assembly and disassembly of the threaded bolt 23, the bore of the bolt is provided with a multi-faceted surface 27 so that a fastening key having a complementary outer configuration to fit into the multi-faceted bore surface 27 may be inserted therein and upon rotation turn the threaded bolt to achieve the fastening and seating action of the wheel flange 3 and sleeve member 4.

The threaded bolt 23 is provided with a circumferentially extending annular projection adjacent one axial end thereof which acts as a centering surface 28 for the wheel 1. At the opposite end, a cover plate 29 press fitted into the bore 26 of the threaded bolt 23 to seal the homokinetic joint 5 from the outside.

In summary, therefore, the parts of the assembly are easy to put together and disassemble when necessary to replace, for example, bearing elements. Initially, the bearing assembly 13 is slid onto the bearing surface 15 of the sleeve member until the inner ring member 12' abuts the flange 10. Thereafter the wheel flange 3 is positioned adjacent the sleeve member 4 so that the bores are generally aligned. The threaded bolt 23 is then first turned into the wheel flange 3 and as it is continuously threaded into the sleeve member 4, it draws the wheel flange 3 and sleeve member 4 toward one another so the gears 8 and 9 mesh whereby all the parts rotate as a single unit. Thereafter, the wheel 1 may be positioned over the centering surface 28 and secured to the wheel flange by bolts.

Alternatively, the wheel flange 3 may be threaded partially on the threads 24 of bolt 23 and then screw sleeve 4 with bearing ring parts 12, 12' onto threads 25 of bolt 23 until contact with flange 4 and thereafter turn all parts as a unit until the desired preload of the bearing is achieved.

While a particular embodiment of the present invention has been illustrated and described herein, it is to be understood that changes and modifications may be made therein within the scope of the following claims.

What is claimed is:

1. A hub bearing assembly for the wheel of a motor vehicle comprising a wheel flange having means for mounting the wheel of the vehicle thereto and a drive joint including a sleeve member, a rolling bearing assembly mounted on the outer periphery of the sleeve member, said wheel flange and sleeve member having confronting interengaging means, said wheel flange having a threaded central bore of a pitch differing from the pitch of a threaded bore of said sleeve member and a threaded bolt with differential thread portions engageable in the aligned threaded bores of said wheel flange and sleeve member to permit axial adjustment of said wheel flange and sleeve member and engagement or disengagement of said interengaging means.

2. A hub bearing assembly as claimed in claim 1 wherein said threaded bolt includes a radially outwardly projecting circumferentially extending flange defining a centering surface for a wheel and/or a brake disc mounted thereon.

3. A hub bearing assembly as claimed in claim 1 wherein the threaded bolt has a central bore and a multi-faceted planar surface formed therein for engagement by a fastening key of complementary configuration which when inserted therein affects rotation of the threaded bolt to secure the wheel disc for rotation with the sleeve member of the joint.

4. A hub bearing assembly as claimed in claim 1 wherein said interengaging means comprises gear teeth at one end of said wheel flange adapted to mesh with gear teeth formed on the sleeve member.

5. A hub bearing assembly as claimed in claim 1 wherein said bearing assembly includes a pair of side-by-side inner rings and wherein said wheel flange has an abutment shoulder confronting the axial end face of one of said inner rings and said sleeve member is formed with a shoulder confronting an axial end face of the other inner ring whereby upon axial movement of said sleeve member and wheel flange toward one another, the rings of said bearing assembly are pressed together and thus the rolling bearing is adjusted or preloaded.

6. A hub bearing assembly as claimed in claim 1 wherein the pitch of the threads of the threaded bore of said sleeve member is greater than the pitch of the threaded bore of said wheel flange.

* * * * *